(No Model.)
J. H. BRAFFORD.
GATE.
No. 392,778. Patented Nov. 13, 1888.
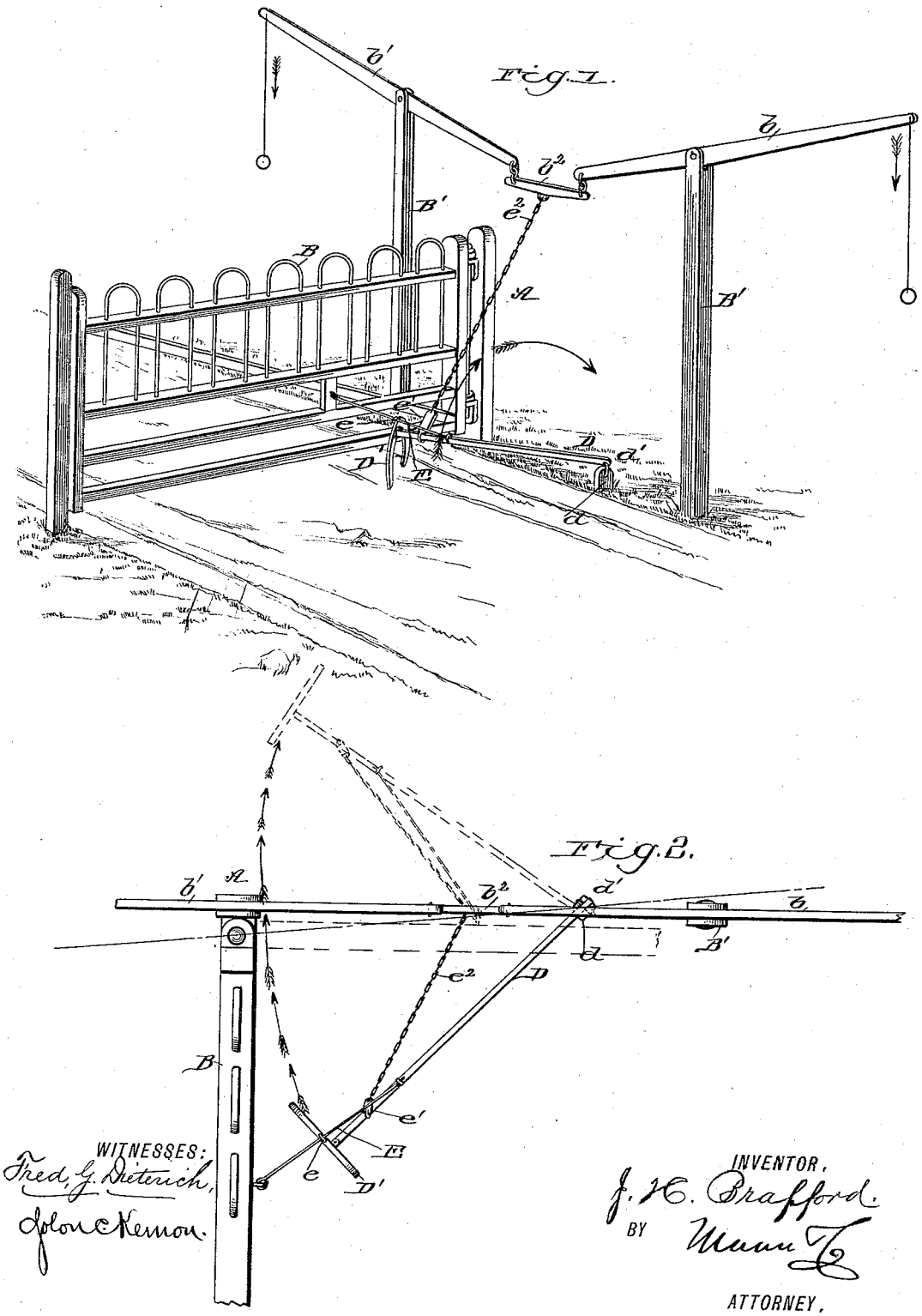
WITNESSES:
Fred. G. Dieterich
Solon C. Kemon
INVENTOR.
J. H. Brafford.
BY Munn & Co.
ATTORNEY.

UNITED STATES PATENT OFFICE.

JOHN H. BRAFFORD, OF LEBANON, KENTUCKY, ASSIGNOR TO HIMSELF AND T. W. MINTON, OF SAME PLACE.

GATE.

SPECIFICATION forming part of Letters Patent No. 392,778, dated November 13, 1888.

Application filed April 25, 1888. Serial No. 271,765. (No model.)

*To all whom it may concern:*

Be it known that I, JOHN H. BRAFFORD, of Lebanon, in the county of Marion and State of Kentucky, have invented a new and Improved Gate, of which the following is a full, clear, and exact description.

My invention relates to an improved gate, and has for its object to provide a gate opened or closed by levers, which will be simple, economical, and effective in operation.

The invention consists in the construction and operation of the several parts, as will be hereinafter fully set forth, and pointed out in the claims.

Reference is to be had to the accompanying drawings, forming a part of this specification, in which similar letters of reference indicate corresponding parts in both figures.

Figure 1 is a perspective view of the gate closed; and Fig. 2 is a plan view of the same, enlarged, a portion being broken away and the gate shown open in dotted lines.

In the figures, A represents a gate-post; B, a gate hinged thereto. A little to the rear of the gate-post, and upon each side, a standard, B', is planted, upon which standards are respectively pivoted levers $b$ $b'$, having their approaching ends united and held a sufficient distance apart by means of a short bar, $b^2$, linked to the levers.

Upon one side of the gate B, about in line with the gate-post, a short post, $d$, is planted or otherwise secured in the ground, and to the said post a bar, D, is pivoted by means of a link, $d'$, the said bar, when the gate is closed, approaching the same at an angle of about forty-five degrees. To the extremity of the bar, near the gate, a horseshoe-block, D', is pivoted at one side of its center, the said bar D and block D' being respectively denominated an "anchor-bar" and "anchor." A connecting-rod, E, is hinged to the gate and likewise to the anchor-bar, said rod, when the gate is closed, being engaged by a hook, $e$, secured to the upper surface of the anchor. Near the intersection of the anchor-bar with the anchor, and upon said bar, a link, $e'$, is swiveled, which link is connected with the lever spacing-bar $b^2$ by a length of chain, rope, or other suitable connection, $e^2$.

To open the gate, the outer end of either lever—say $b$—is pulled down, which has the effect of raising the inner weighted end of the bar D, (see arrows,) and also swinging it laterally past and away from the pivot-post A to the right, where it drops and rests on the ground, as shown by dotted lines, Fig. 2. In this operation the hook $e$ is freed from the rod E when the bar D is first lifted, as above stated, and the gate is compelled to follow the bar in its movement by reason of its connection with the same by means of the rod E. To close the gate again, either lever is pulled down, thereby raising the head D' of bar D and swinging it back to its original position, as shown by full lines, Figs. 1 and 2, in which movement the gate is forced to precede, being pushed by the rod E, as will be readily understood. Thus in moving either way to open or close the gate the head of bar D describes the nearly-vertical arc of a circle. Its head D' serves as an anchor by reason of its weight as well as its form, which enables it to take into the ground more or less.

Having thus described my invention, I claim as new and desire to secure by Letters Patent—

1. The combination, with the horizontally-swinging gate and its pivot-post, of the anchor-bar D, pivoted at one side of the pivot-post, and the anchor D', attached to the free end of said bar and projecting downward so as to take into the ground and hold the gate closed or open, a rod, E, which connects the gate and anchor-bar, and means for swinging the head of the latter past the pivot-post in the arc of a circle from right to left and reversely, as shown, for opening and closing the gate, as specified.

2. The combination, with a gate, levers pivoted at each side of the same, and a spacing-bar connecting the extremities of the levers, of a pivotal anchor-bar, an anchor hinged to said bar, a chain connection between the extremities of the anchor-bar and the spacing-bar, a connecting-rod hinged to the anchor-bar and gate, and a hook secured to the anchor, adapted to engage the connecting-rod, substantially as shown and described.

JOHN H. BRAFFORD.

Witnesses:
WALTER W. RUBEL,
OWEN D. THOMAS.